United States Patent [19]

Olger

[11] Patent Number: 4,777,992
[45] Date of Patent: Oct. 18, 1988

[54] ICE TRAY AND TABLE COVERING COMBINATION

[76] Inventor: Bonnie L. Olger, 14460 Robson Rd., Bath, Mich. 48808

[21] Appl. No.: 53,031

[22] Filed: May 22, 1987

[51] Int. Cl.⁴ .......................... A47B 97/00; F25D 3/08
[52] U.S. Cl. ..................................... 150/52 R; 108/90; 62/459; 206/541; 229/87 F
[58] Field of Search ............. 150/52 R; 206/541, 557, 206/216; 190/1, 2; 229/87 F, 103; 108/26, 90; D6/617; 62/371, 372, 459; 248/346.1

[56] References Cited

U.S. PATENT DOCUMENTS

| | | | |
|---|---|---|---|
| 489,019 | 1/1893 | Lauderdale | 206/557 X |
| 2,349,088 | 5/1944 | Guyer | 206/557 X |
| 2,586,153 | 2/1952 | Eisman | 150/52 R |
| 2,728,165 | 12/1955 | Runyon | 150/52 R |
| 2,809,466 | 10/1974 | Glover | 150/52 R |
| 2,825,050 | 7/1974 | Glover | 150/52 R |
| 3,097,782 | 7/1963 | Koropatkin et al. | 229/103 |
| 3,594,177 | 7/1971 | McGowan | 229/87 F X |
| 4,337,812 | 7/1982 | Trinkner | 150/53 R X |
| 4,375,758 | 3/1983 | Simmons | 62/459 X |
| 4,489,815 | 12/1984 | Martinez | 190/2 X |
| 4,499,999 | 2/1985 | Behar | 206/541 X |
| 4,542,050 | 9/1985 | Gallant | 150/52 R X |

FOREIGN PATENT DOCUMENTS 2408330  7/1979  France ................................. 108/90

Primary Examiner—William Price
Assistant Examiner—Sue A. Weaver
Attorney, Agent, or Firm—Ian C. McLeod

[57] ABSTRACT

A foldable ice tray and table covering combination (10, 20) is described. The combination has a sheet (11, 21) of material which is placed on the table and foldable walls (11a to 11d or 22a to 22d). Optionally carrying handles 12 or drain holes a with plug 24 or a second sheet or cover (23a and 23b) for the ice (100) and food (101 to 103) are provided.

14 Claims, 3 Drawing Sheets

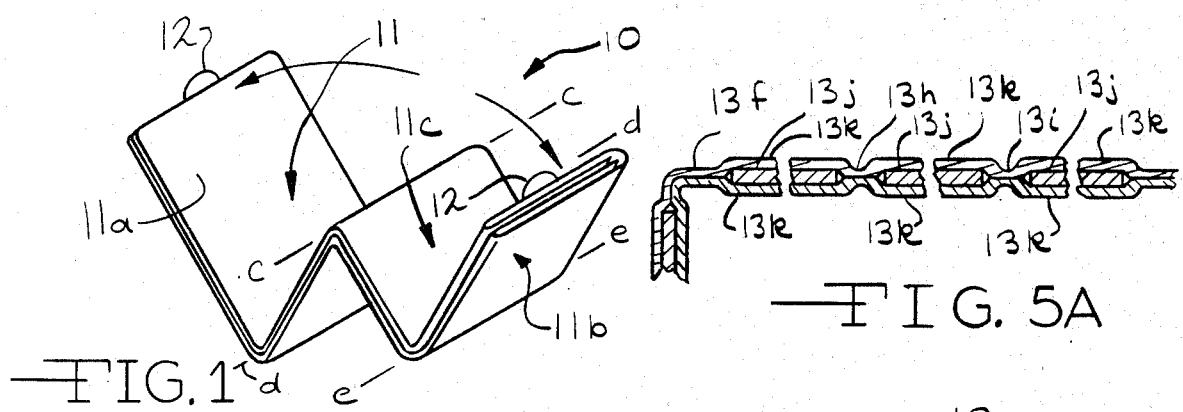
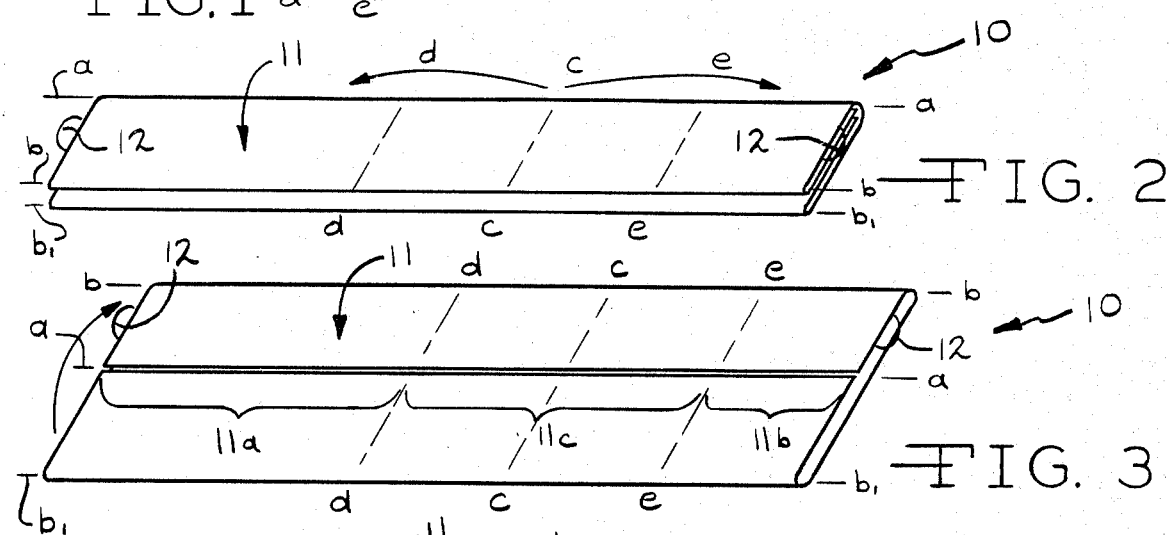
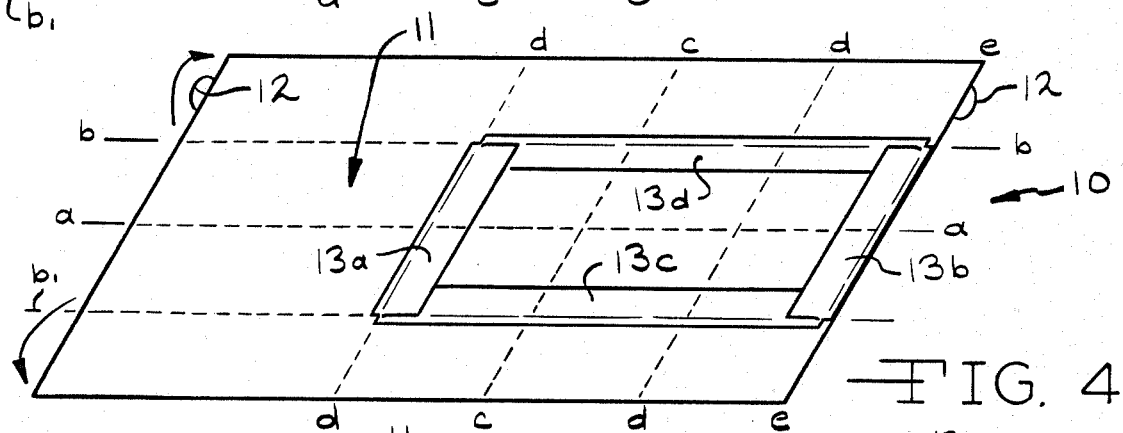
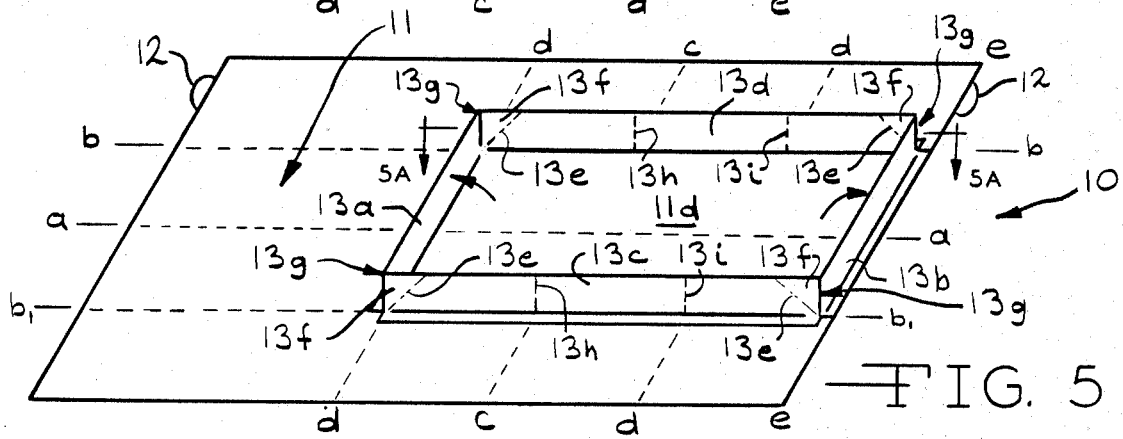

ICE TRAY AND TABLE COVERING COMBINATION

BACKGROUND OF THE INVENTION (1) Field of the Invention

The present invention relates to an ice tray and table covering combination which is foldable into a compact flat bundle. In particular the present invention relates to the combination wherein relatively rigid walls forming the ice tray are foldable.

(2) Prior Art

Table cloths are well known as are rigid containers for ice. It is not believed that the prior art has shown a foldable combination of an ice tray and table covering. The problem is that at picnics and the like there is a need for an ice tray which is as easily folded into a flat bundle and transported in the same manner as a table covering.

OBJECTS

It is therefore an object of the present invention to provide an ice tray and table covering combination which is foldable into a flat bundle. Further it is an object of the present invention to provide such a combination which is simple and inexpensive to construct. These and other objects will become increasingly apparent by reference to the following description and the drawings.

IN THE DRAWINGS

FIG. 1 is a front perspective view of a preferred folded ice tray and table covering combination 10.

FIGS. 2 to 5 are front perspective views of the ice tray and table covering combination 10 as it is unfolded.

FIG. 5A is a sectional view of the wall 13d shown in FIG. 5 along line 5A—5A.

Figure 10:
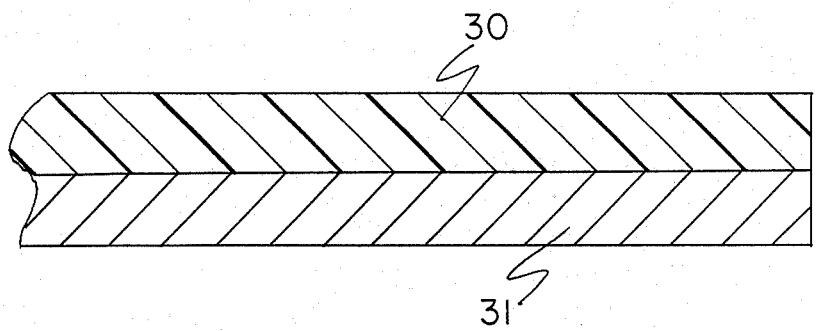

FIG. 10 is a partial section of a preferred sheet 11 and showns a plastic material 30 overlaying a cloth material 31.

GENERAL DESCRIPTION

The present invention relates to a foldable ice tray and table covering combination which comprises: a foldable sheet of material having an upper surface and adapted to be placed on a table; and a tray comprising at least one wall forming an enclosed portion on the upper surface of the sheet wherein the wall is perpendicular to the upper surface of the sheet in use and can be folded to lay flat upon the upper surface of the sheet so that the combination can be folded into a flat and compact bundle for storage and wherein the enclosed portion and walls are adapted to hold ice at ambient temperatures. The wall can have a round, square, rectangular or any other shape.

Further the present invention relates to a foldable ice tray and table covering combination for cooling and serving food which comprises: a foldable sheet of a material having an upper surface; a tray comprising four walls forming an enclosed portion having a generally rectangular shape on the upper surface of the sheet wherein the walls are perpendicular to the upper surface of the sheet in use and can be folded at corners between the walls to lay flat upon the upper surface of the sheet wherein each of the walls are foldable so that the cloth can be first folded with the walls flat on the upper surface of the sheet and then folded on at least one first axis between a first pair of spaced apart walls and then folded on at least one second axis between a second pair of spaced apart walls wherein the combination can be folded into a compact bundle for storage. A second sheet of material mounted on the sheet of material can be provided to cover the food.

Preferably the sheets of material comprise a plastic laminated to a fabric which is impenetrable to water. Sheets of plastic alone can also be used but do not fold as well. A water permeable cloth can be used where this does not make a difference such as at wooden parkside tables. Numerous variations of the sheet material will occur to those skilled in the art.

Preferably most of the area of the walls are relatively rigid sections with flexible sections intermediate the ends, at corners and between the flexible sheet and the walls. Flexible sections can be provided by connecting a flexible material at the sections of the wall to be folded between the rigid sections of the walls. This can be accomplished by gluing, stitching and the like in a well known manner. The rigid sections of the walls can be covered with a flexible material with the flexible sections between the rigid sections and then bonded to the sheet of flexible material. Numerous variations will occur to those skilled in the art.

SPECIFIC DESCRIPTION

FIGS. 1 to 5 show a preferred embodiment of the ice tray and table covering combination 10 of the present invention as it is unfolded. In FIG. 1 the combination 10 is in the form of a bundle which is unfolded as shown in FIG. 1 and the sheet 11 has a W shape with legs 11a and 11b between a center portion 11c. As can be seen crease lines or axis c—c, d—d and e—e are provided in the combination 10. Handles 12 join together for ease of carrying of the bundle. In FIG. 2 the bundle is unfolded so that the axis c—c, d—d and e—e are in the same plane with folds on creases or axis a—a, b—b, and $b_1$—$b_1$. The legs 11a and 11b and center section 11c are shown by brackets in FIG. 3. In FIG. 3 the crease or axis a—a is unfolded. In FIG. 4 the axis or creases b—b and $b_1$—$b_1$ are unfolded and the opposed folded walls 13a and 13b and 13c and 13d are laying flat on the upper surface of sheet 11. In FIG. 5 the walls are raised to form an enclosed portion 11d on the sheet 11 which functions as the tray. As can be seen from FIG. 5 the walls 13c and 13d have an angled section 13e and a flexible material section 13f which allows the corners 13g to be folded. FIG. 5A shows flexible sections 13f, 13h and 13i with the flexible 13k material covering rigid sections 13j. As can be seen, the ice tray and cloth combination 10 can be easily folded into a compact bundle and then unfolded or vise versa.

Figure 6:
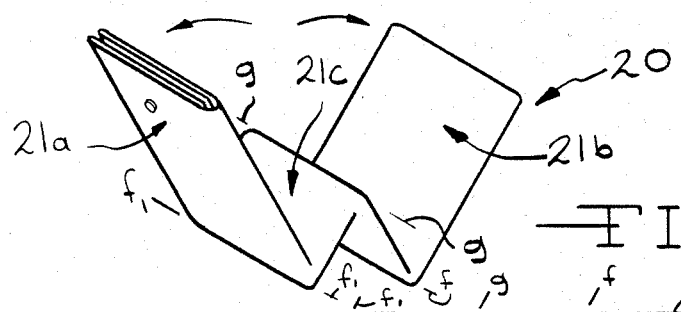
FIG. 6 is a front perspective view of another preferred folded ice tray and table covering combination 20.
Figure 7:
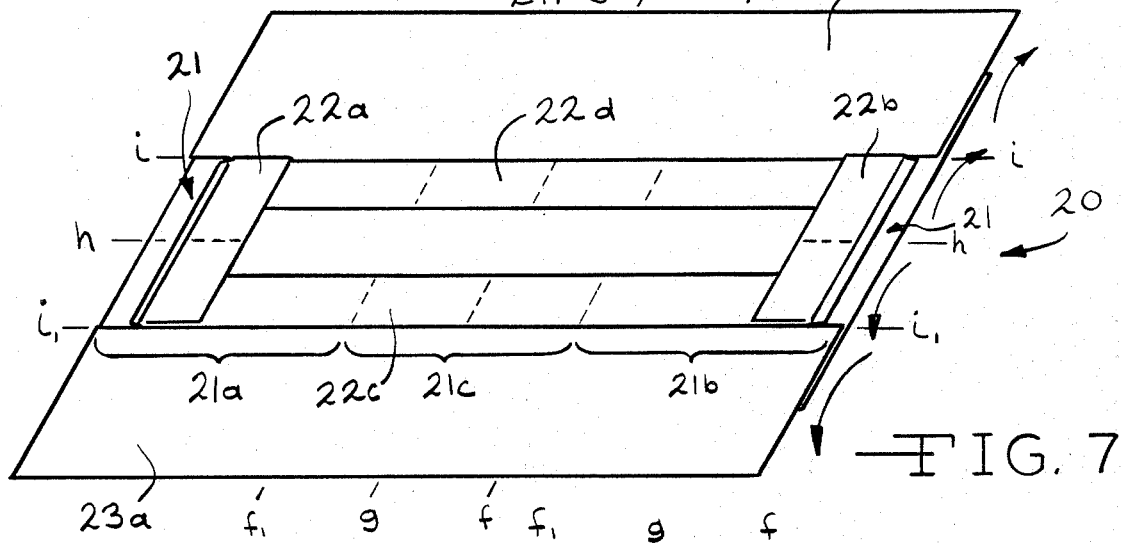
FIGS. 7 to 9 are front perspective views of the ice tray and table covering combination 20 as it is unfolded.
Figure 8:
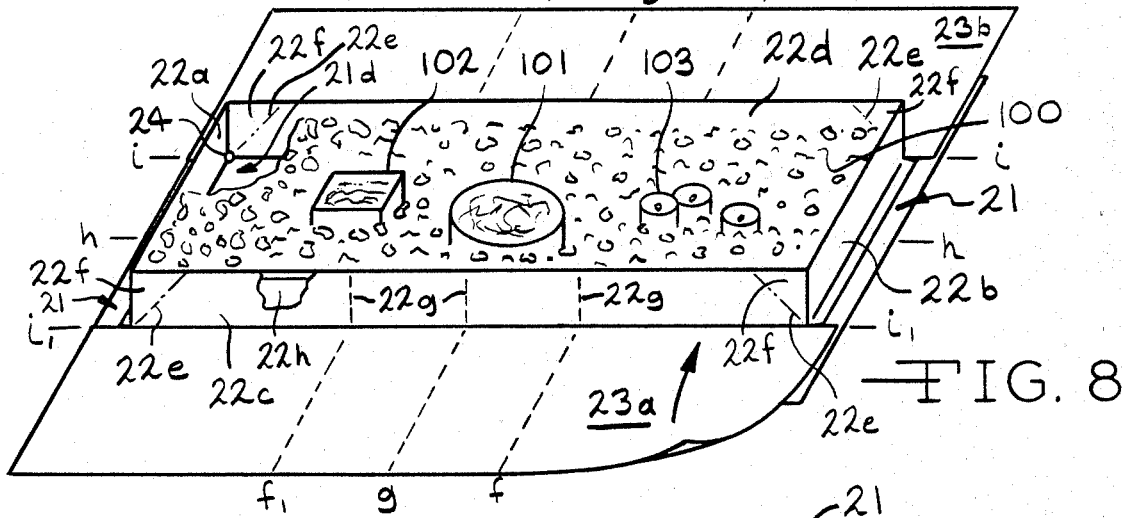
Figure 9:
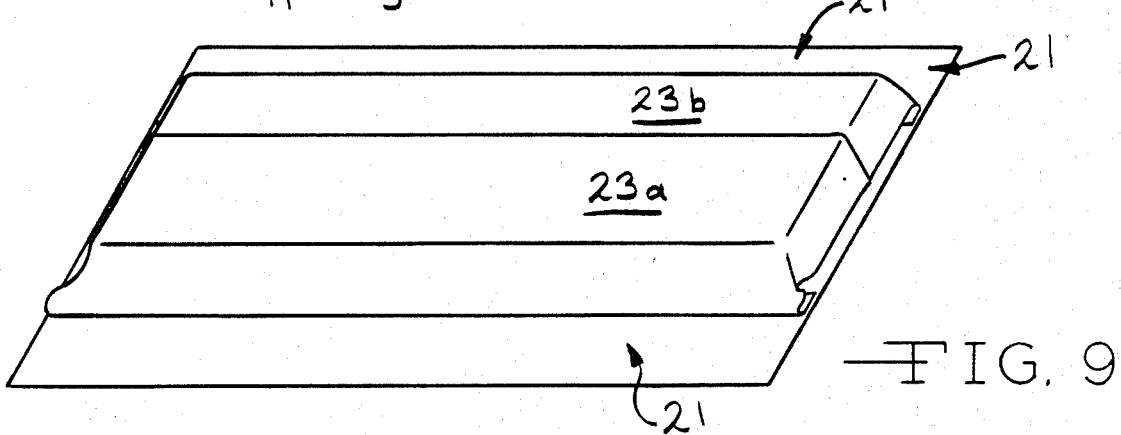

FIGS. 6 to 9 show another preferred version of the ice tray and table covering combination 20. In FIG. 6, the combination 20 is folded in a bundle having a folded W shape with legs 21a and 21b and a center portion 21c as also shown in FIG. 7. The sheet 21 unfolds along lines or creases f—f, $f_1$—$f_1$ and g—g and then along lines h—h and i—i and $i_1$—$i_1$ as shown in FIG. 7 exposing a folded ice tray formed by opposed sides 22a and 22b and opposed sides 22c and 22d which lay flat on the upper surface of sheet 21. Additional second sheets 23a and 23b are mounted along walls 22c and 22d over portions of the sheet 21. In FIG. 8 the walls are raised perpendicular to the sheet 21. Angled corners 22e, flexible material sections 22f and 22g and rigid sections 22h are provided as the embodiment shown in FIGS. 1 to 5. As shown in FIGS. 8 and 9, the second sheets 23a and 23b cover ice 100 and food containers 101, 102 and 103 in the enclosure 21d such as cans 103 and salads 101 and 102. The second sheet 23a and 23b keep insects and dirt off of the food containers 101, 102 and 103. A drain hole with a plug 24 is preferably provided for removal of water from melting ice.

FIG. 10 show a preferred construction of the sheet 11. A plastic material 30 provides a water barrier for cloth material 31.

It is intended that the foregoing description be only illustrative of the present invention and that the invention be limited only by the hereinafter appended claims.

I claim:

1. A foldable ice tray and table covering combinations which comprises:
   (a) a foldable sheet of material having an upper surface and adapted to be placed on a table; and
   (b) the sheet including a tray comprising generally rectangular walls forming an enclosed portion on the upper surface of the sheet, means connecting the walls perpendicular to the upper surface of the sheet in use and means enabling the walls to be folded to lay flat upon the upper surface of the sheet so that the combination of the walls and the sheet can be folded into a flat and compact bundle for storage and wherein the enclosed portion and walls hold ice at ambient temperatures.

2. A foldable ice tray and table covering combination for cooling and serving food which comprises:
   (a) a foldable sheet of a material having an upper surface;
   (b) a tray comprising four walls forming an enclosed portion having a generally rectangular shape on the upper surface of the sheet wherein the walls are perpendicular to the upper surface of the sheet in use and means enabling it to be folded at corners between the walls to lay flat upon the upper surface of the sheet wherein each of the walls are foldable so that the sheet can be first folded with the walls flat on the upper surface of the sheet and then folded on at least one first axis perpendicular to a first pair of spaced apart walls and then folded on at least one second axis along the second pair of spaced apart walls wherein the combination can be folded into a compact bundle for storage.

3. The ice tray and table covering combination of claim 2 wherein a second sheet of a foldable material is mounted on the upper surface of the foldable sheet around the tray so that the second sheet can be moved to cover the tray in use.

4. The ice tray and cloth combination of claim 2 wherein two second sheets of material are secured to the first sheet adjacent a pair of opposed walls of the tray and can be moved to cover the tray in use.

5. The foldable ice tray and table covering combination of claim 2 wherein the foldable sheet of material is a water impermeable, fabric reinforced plastic sheet.

6. The foldable ice tray and table covering combination of claim 2 wherein the walls comprise a length of a rigid material between the corners covered with a foldable material with foldable sections between the corners and wherein the rigid material is secured to the upper surface of the foldable sheet by the foldable material.

7. The foldable ice tray and table covering combination of claim 6 wherein the foldable sheet is a water impermeable, cloth reinforced plastic.

8. The foldable ice tray and table covering combination of claim 6 wherein a second sheet of foldable material is mounted on the upper surface of the foldable sheet so that the second sheet can be moved to cover the tray in use.

9. The ice tray and table covering combination of claim 6 wherein two second sheets of material are mounted on the first sheet with one second sheet adjacent opposed walls of the tray and wherein the sheets can be moved to cover the tray in use.

10. The ice tray and table covering combination of claim 1 wherein the enclosed portion of the sheet contains a drain hole and plug.

11. The ice tray and table covering combination of claim 2 wherein the foldable sheet is rectangular in shape with the rectangular tray centered on at least one axis on the upper surface of the sheet, wherein for storage the foldable sheet is first folded over the tray along a length of the sheet and along each of the second pair of walls, then folded along a midline between the first pair of walls, and then folded parallel to the first pair of walls so that the sheet forms folds in a W cross-sectional shape with legs between a center section.

12. The foldable ice try and table covering combination of claim 2 wherein the first or second pair of walls has a rigid portion with angled sections towards the upper surface of the sheet adjacent the corners and with a flexible portion between the walls at the angled sections at each corner.

13. The foldable ice tray and table covering of claim 2 wherein opposed ends of the sheet have handles which come together for carrying the folded bundle.

14. The ice try and table covering of claim 11 wherein opposed ends of the covering have handles at the ends of the legs of the W which come together for carrying the folded bundle.

* * * * *

UNITED STATES PATENT AND TRADEMARK OFFICE
CERTIFICATE OF CORRECTION

PATENT NO. : 4,777,992
DATED : October 18, 1988
INVENTOR(S) : Bonnie L. Olger

It is certified that error appears in the above—identified patent and that said Letters Patent is hereby corrected as shown below:

Column 2, line 58 "vise verse" should be --vice versa--.

Column 3, line 13 "show" should be --shows--.

Column 4, line 42 "try" should be --tray--.

Column 4, line 51 "try" should be --tray--.

Signed and Sealed this

Twenty-eighth Day of February, 1989

Attest:

DONALD J. QUIGG

Attesting Officer

Commissioner of Patents and Trademarks